United States Patent
Peoples et al.

(10) Patent No.: US 12,202,983 B2
(45) Date of Patent: Jan. 21, 2025

(54) ALUMINAS AND METHODS FOR PRODUCING SAME

(71) Applicant: Sasol (USA) Corporation, Houston, TX (US)

(72) Inventors: Brian Peoples, Westlake, LA (US); Allison Hann, Westlake, LA (US)

(*) Notice: Subject to any disclaimer, the term of this patent is extended or adjusted under 35 U.S.C. 154(b) by 833 days.

(21) Appl. No.: 17/276,524

(22) PCT Filed: Oct. 2, 2019

(86) PCT No.: PCT/US2019/054244
§ 371 (c)(1),
(2) Date: Mar. 16, 2021

(87) PCT Pub. No.: WO2020/072607
PCT Pub. Date: Apr. 9, 2020

(65) Prior Publication Data
US 2022/0033657 A1    Feb. 3, 2022

Related U.S. Application Data

(60) Provisional application No. 62/740,493, filed on Oct. 3, 2018.

(51) Int. Cl.
*C09C 1/40* (2006.01)

(52) U.S. Cl.
CPC .......... *C09C 1/407* (2013.01); *C01P 2004/51* (2013.01); *C01P 2004/64* (2013.01); *C01P 2006/22* (2013.01)

(58) Field of Classification Search
None
See application file for complete search history.

(56) References Cited

U.S. PATENT DOCUMENTS

| | | | | |
|---|---|---|---|---|
| 3,706,693 A | * | 12/1972 | Mickelson et al. | C10G 45/64 502/210 |
| 4,994,429 A | | 2/1991 | Wieserman et al. | |
| 6,986,943 B1 | * | 1/2006 | Cook | B82Y 30/00 428/404 |

FOREIGN PATENT DOCUMENTS

| | | | | |
|---|---|---|---|---|
| DE | 102006007888 | | 8/2007 | |
| EP | 0273756 | * | 12/1987 | |
| JP | 2007290943 | | 11/2007 | |
| WO | 2006060510 | * | 6/2006 | |
| WO | WO-2006060510 A2 | * | 6/2006 | C09D 1/00 |
| WO | 2016193000 | | 12/2016 | |
| WO | 2017135193 | * | 8/2017 | |

OTHER PUBLICATIONS

ChEBI: 48108 "Phosphono Group". 2016 (Year: 2016).*

* cited by examiner

*Primary Examiner* — Sheng H Davis
(74) *Attorney, Agent, or Firm* — Werner IP Law, P.C.

(57) ABSTRACT

The present invention is directed to a method for producing a modified alumina by modifying a surface of an alumina with the addition of a phosphono group containing modifier. The invention is further directed to a modified alumina produced according to the method of the present invention and to a modified alumina having specific characteristics.

12 Claims, 3 Drawing Sheets

ALUMINAS AND METHODS FOR PRODUCING SAME

CROSS REFERENCE TO RELATED APPLICATION

Figure 1:
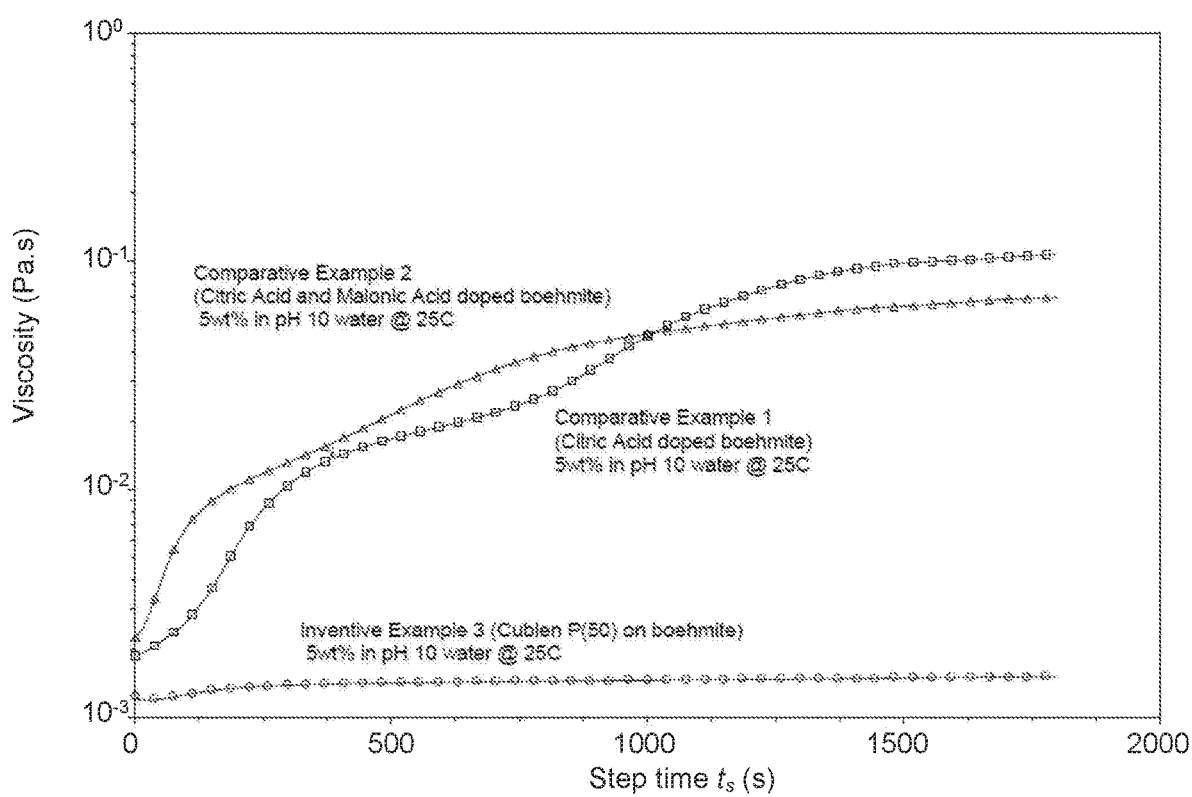

This application is a national phase of PCT/US2019/054244, filed Oct. 2, 2019, which in turn claims priority to U.S. Application No. 62/740,493 filed on Oct. 3, 2018, the disclosures of which are incorporated herein by reference for all purposes.

FIELD OF THE INVENTION

The present invention relates to a method(s) for producing a surface modified alumina. In particular, the present invention relates to a method of producing a surface modified alumina which is dispersible at a pH of 8 and above and which has a low viscosity at a pH of 8 and above. The invention extends to a modified alumina produced according to the method of the invention and to a modified alumina having specific characteristics.

BACKGROUND OF THE INVENTION

It is well known that alumina modified with citric acid produces a modified alumina which is dispersible at a pH of 8 and above. However, an issue with these citric acid modified aluminas is that at a pH of 8 and above, the viscosity of these materials increases rapidly, to the point that processing of these materials becomes difficult.

In order to address this problem, the use of a second carboxylic acid e.g. malonic acid is required. The addition of the malonic acid reduces the viscosity of the citric acid modified alumina at a pH of 8 and above.

While this solution is effective, it requires the use of a second modifying agent and increases the amount of modifier added substantially. This can be detrimental to some applications, for example ceramics, in which the additional modifier can result in complications during the forming and burnout stages of production, and potentially introduce undesirable interactions with other components of the system.

An object of the present invention is to overcome the drawbacks indicated by what is known in the art of the invention.

The inventors have surprisingly found a new method to modify a surface of an alumina to produce a modified alumina that is dispersible at a pH of 8 and above and which has a low viscosity at a pH of 8 and above as well as having low loadings of the modifier.

SUMMARY OF THE INVENTION

According to one aspect of the invention there is provided a method for producing a modified alumina including the steps of:
i) providing an alumina; and
ii) adding a phosphono group containing modifier to the alumina to produce a surface modified alumina.

The invention may include a further step of drying the surface modified alumina after the addition of the phosphono group containing modifier.

The invention may also include:
a) a further step of aging the alumina before the addition of the phosphono group containing modifier to form an aged alumina having a crystallite size of 35 to 450 Å (as measured on the 120 plane); or
b) a further step of aging the surface modified alumina to form an aged surface modified alumina; or
c) a) and b) above.

The invention may include an aging step as described above (either a) or b)) and a drying step, or both the aging steps as described in c) above and a drying step.

Therefore:

A first option of the first aspect of the invention is a method for producing a modified alumina including the steps of:
i) providing an alumina;
ii) aging the alumina to form an aged alumina by hydrothermal treatment until the alumina has a crystallite size of 35 to 450 Å (as measured on the 120 plane);
iii) adding an phosphono group containing modifier to the aged alumina to produce a surface modified alumina; and
iv) optionally drying the surface modified alumina to produce a modified alumina.

A second option of the first aspect of the invention is a method for producing a modified alumina including the steps of:
i) providing an alumina;
ii) adding an phosphono group containing modifier to the alumina to produce a surface modified alumina;
iii) aging the surface modified alumina by thermally treating the surface modified alumina (preferably at an elevated temperature under autogenous pressure) to form an aged surface modified alumina; and
iv) optionally drying the aged surface modified alumina to produce a modified alumina.

A third option of the first aspect of the invention is a method for producing a modified alumina including the steps of:
i) providing an alumina;
ii) aging the alumina to form an aged alumina by hydrothermal aging until the alumina has a crystallite size of 35 to 450 Å (as measured on the 120 plane);
iii) adding an phosphono group containing modifier to the alumina to produce a surface modified alumina;
iv) aging the surface modified alumina by thermally treating the surface modified alumina (preferably at an elevated temperature under autogenous pressure) to form an aged surface modified alumina; and
v) optionally drying the aged surface modified alumina to produce a modified alumina.

It is preferred to include the drying step for all options of the first aspect of the invention.

According to a second aspect of the invention there is provided a modified alumina produced according to the method of the invention.

According to a third aspect of the invention, there is provided a modified alumina including at least one, preferably more than one, most preferably all of the following characteristics after dispersion at a pH of 8 or above:
i) an isoelectric point at a pH of less than 4;
ii) a dispersibility of greater than 90% when dispersed at a loading of 5, 10 or 20 weight percent into a basic solution;
iii) a particle size distribution having a D50 below 250 nm when dispersed at a loading of 5, 10 or 20 weight percent into a basic solution; and, or
iv) a viscosity of less than 50 cP at 500 s$^{-1}$.

The isoelectric point is measured by zeta potential measurements starting from a pH of 10 and titrating with an acid.

The dispersibility is measured such that the pH of the resulting suspension is maintained above the isoelectric point (IEP) of the material.

The particle size distribution is measured using a light scattering measurement instrument including the Horiba 950 and proper dilution.

By basic solution for the measurement of dispersibility and particle size distribution is meant a solution with a pH of 9 or higher. A preferred basic solution is an ammonium hydroxide solution.

The viscosity is measured by transferring an aliquot of the suspension into a concentric cylinder geometry of a TA instruments DHR 2 rheometer maintained at 25° C. A shear sweep is run from 0.1 to 3600 $s^{-1}$.

The characteristics of the modified alumina as defined in the third aspect of the invention apply to the modified alumina of the second aspect of the invention.

DETAILED DESCRIPTION OF PREFERRED EMBODIMENTS

The present invention is directed to a method for producing a modified alumina by modifying a surface of an alumina with the addition of a phosphono group containing modifier. Optionally, the present invention is directed to a method for producing a modified alumina by modifying a surface of an alumina, or a hydrothermally aged alumina, with the addition of a phosphono group containing modifier. The invention may therefore include one or more aging steps. The invention preferably includes a drying step. The various options of the first aspect of the invention are outlined in the options to the first aspect of the invention. The invention is further directed to a modified alumina produced according to the method of the present invention and to a modified alumina having specific characteristics.

The elements of the invention will be described hereunder:

Alumina

The alumina includes aluminum oxyhydroxide, aluminum oxide, aluminum hydroxide, or mixtures thereof. The alumina is preferably an aluminum oxyhydroxide. The aluminum oxyhydroxide preferably includes boehmite or a pseudoboehmite, and is most preferably boehmite.

The alumina may be in the form of dry particles, included in an aqueous slurry, an acidized alumina composition, or mixtures thereof. In a preferred embodiment of the invention, the alumina is included in an aqueous slurry. The aqueous slurry is prepared by adding the alumina, preferably boehmite, to at least water.

The alumina to be utilised by the present method has a controlled crystallite size.

In this regard the alumina of the invention may include particles having an average crystallite size of from 30 to 500 Å, preferably 40 to 400 Å, most preferably 80 to 200 Å as measured by X-ray diffraction on a 120 plane. The crystallite size of the alumina may be altered by the inclusion of an aging step (hydrothermal aging). This includes heating the alumina at a temperature of between 100 and 200° C. for a period of 0.5 to 4 hours until the crystallite size of the alumina is between 40 and 450 Å

Further, the alumina may have a BET surface area of from 80 to 300 $m^2/g$, preferably a BET surface area of from 120 to 250 $m^2/g$.

Phosphono Group Containing Modifier

The phosphono group containing modifier of the present invention includes an organic phosphorous compound, preferably a linear or branched alkyl group having 1 to 20 carbon atoms. The phosphono group containing modifier preferably also contains at least one carboxyl (COOH) group and bears at least one phospono moiety. The phosphono moiety includes a primary phosphono-alkylcarboxylic acid, a secondary phosphono-alkylcarboxylic acids, a primary dicarboxylic acid, a secondary alkyl dicarboxylic acid, a primary phosphono-alkyl tricarboxylic acid, a phosphine alkane carboxylic acid or mixtures thereof. The phosphono moiety is more preferably a primary-alkylcarboxylic acid, a secondary phosphono-alkylcarboxylic acid, a primary dicarboxylic acid, a secondary alkyl dicarboxylic acid a primary phosphono-alkyl tricarboxylic acid or a mixture thereof. The most preferred phosphono group containing modifier is 2-phosphonobutane-1,2,4-tricarboxylic acid.

The phosphono group containing modifier is mixed in with the alumina so as to distribute it on the surface of the alumina.

The phosphono group containing modifier is preferably added to an alumina aqueous slurry or to an aged alumina aqueous slurry.

The phosphono group containing modifier is added in amounts of from less than 10 wt. % based on the alumina, preferably in amounts between 3 wt. % and 10 wt. % based on the alumina, more preferably in amounts of from less than 8 wt. % based on the alumina, and most preferably in amounts between 3 wt. % and 8 wt. % based on the alumina. The percentages are preferably based on alumina of a hydrated powder form.

Aging

As is known in the field of the invention, aging refers to hydrothermal aging.

Hydrothermal aging of the alumina may occur before the addition of the phosphono group containing modifier for a period of between 0.5 and 4 hours at a temperature of between 100 and 200° C.

Alternatively, or additionally, aging may be conducted after the addition of the phosphono group containing modifier for a period of between 0.5 and 2 hrs. at a temperature of between 95 and 125° C.

It is preferred to age after the addition of the phosphono group containing modifier fora period of between 0.5 and 2 hrs. at a temperature of between 95 and 125° C. . . .

Drying Step

As is well known by those of skill in the art, typical processes of producing alumina involve a drying step.

The drying step can be by means of direct or indirect heating methods. These methods may include spray drying, contact drying, pan drying or other drying techniques. In a preferred method the drying takes place in a spray dryer.

The drying process may take place in an inert atmosphere e.g. nitrogen or in air and depending on what method of drying is selected the drying can take place at temperatures between 85° C. to 250° C., preferably between 100° C. to about 250° C., most preferably between 105° C. to 120° C. Furthermore, depending of the drying technique selected, a person skilled in the art of the invention will know how long the drying should take and the timing will therefore vary between a few seconds to between 2 and 6 hours.

For example, if the drying is carried out using a spray dryer the drying step is carried out with an outlet temperature preferably from about 100° C. to about 120° C. and a residence time from a few seconds up to a few minutes. If a contact dryer is used, the equipment can be externally heated with oil that circulates inside an external jacket to the target temperature preferably in the range of 200° C. to 250° C. with a residence time of only a few minutes to a few hours.

ILLUSTRATIVE METHODS OF THE INVENTION

In a first embodiment of the present invention, the phosphono group containing modifier of the present invention is mixed under moderate temperature and pressure conditions, with an alumina aqueous slurry. A drying step may follow.

As an option, the alumina slurry may first be hydrothermally aged to the desired crystallite size to form an aged alumina slurry and then the phosphono group containing modifier may be added to the aged alumina slurry. A drying step may follow.

As a further option, the alumina slurry may first be hydrothermally aged to the desired crystallite size to form an aged alumina slurry and then the phosphono group containing modifier may be added to the aged alumina slurry. A further aging step then follows after the addition of the phosphono group containing modifier, for example, by heating at a temperature of between 95 to 125° C. in a closed reactor vessel operated under autogenic pressure (for example) for sufficient time, preferably for a period of between 1 and 4 hours. A drying step may follow.

The drying takes place without the need for any intermediate filtration or washing steps, to form a modified alumina. It is preferred that drying is to take place.

The invention will now be described by way of example with reference to the following examples and Figures.

FIGURES

Figure 2:
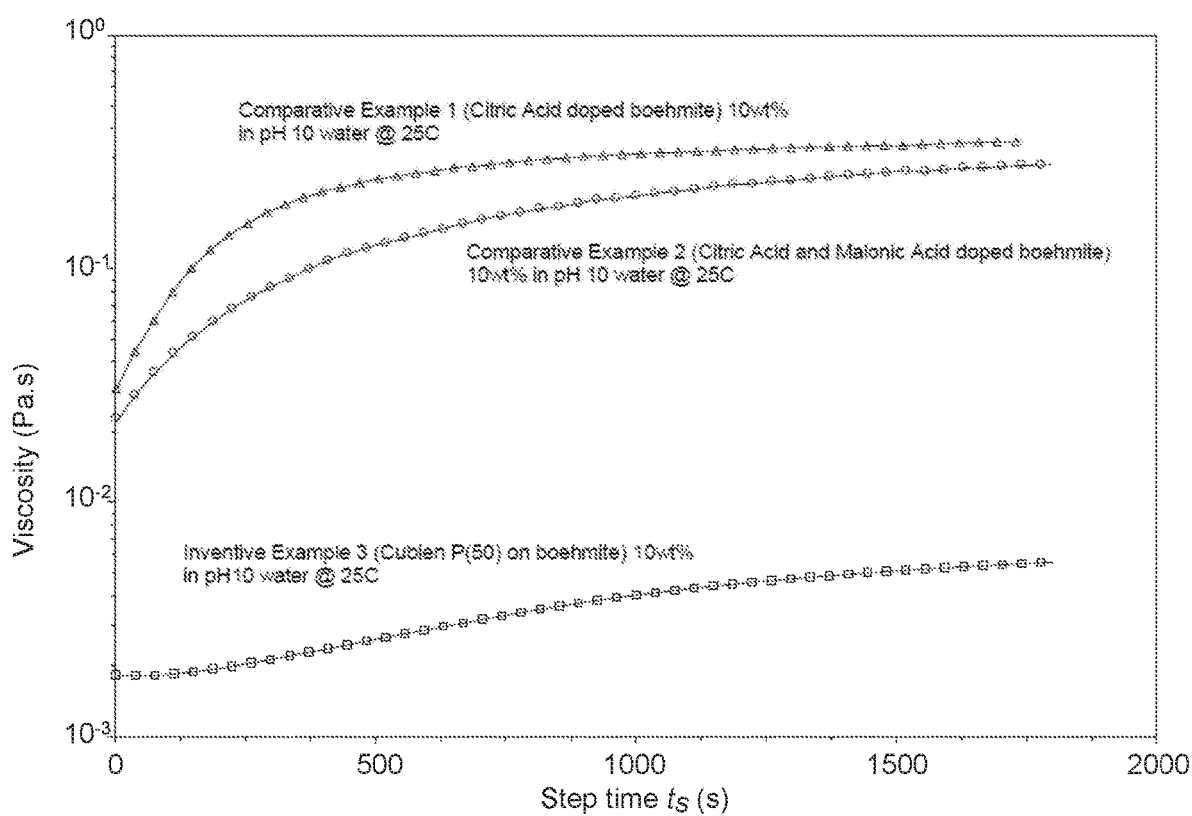
Figure 3:
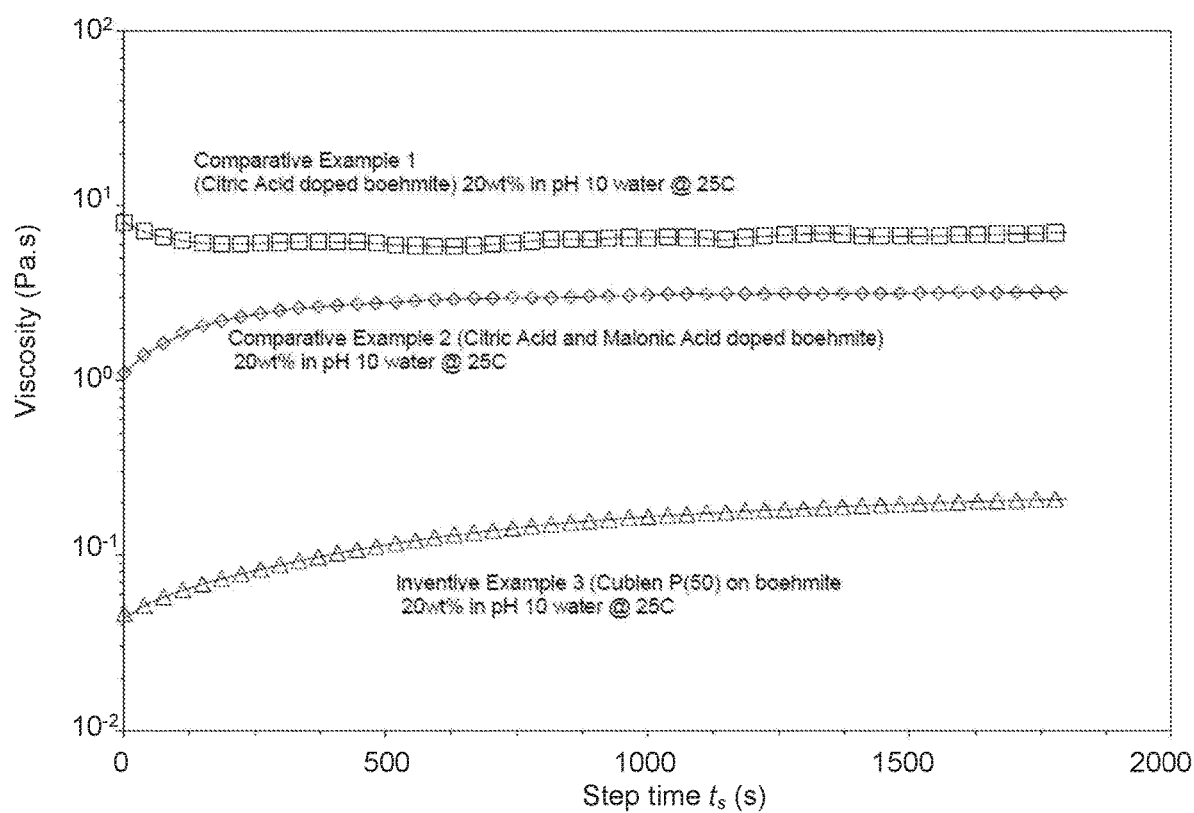

FIGS. 1-3 show results of time dependent viscosity of modified alumina materials as compared with other high pH dispersible materials.

ANALYTICAL METHODS

The properties of the products of the present invention are measured by the following analytical techniques.

The alumina is identified using X-ray analyses. The samples are placed into an XRD 2" diameter plastic disc with a 1" diameter opening. XRD data is acquired on a Bruker AXS D4-ENDEAVOR apparatus. Boehmite and pseudoboehmite, aluminum oxide, aluminum hydroxide, or mixtures are identified by X-ray diffraction as described in the A.S.T.M. X-ray Diffraction Index. The boehmite single particle crystallite sizes are obtained by XRD diffraction technique by X-ray diffraction peaks by using the Debye formula. Crystal sizes are expressed by the length obtained for diffraction peak, the 120 peak. Analysis of peak-width on X-ray powder diffraction peaks at 120 gives the values commonly reported for crystallites size.

Boehmite crystallite size by X-ray diffraction measured 120 crystal size is normal 90° to the 120 plane. This peak (crystal plane) is the most accessible in Boehmite's X-ray diffraction pattern and has been used for the characterization of the alumina.

The particle size of the dispersed alumina is determined using a Horiba instrument.

The surface area values are determined by N2 adsorption. Data is collected on heat treated samples at 550° C. for 3 hours. The samples are then degassed for 0.5 hours under flowing nitrogen at 300° C. Data is collected on a Quantachrome Apparatus. The surface area ($m^2/g$) is evaluated using the B.E.T. equation.

The isoelectric point values are determined using a Malvern Zetasizer. A dispersion of the material is produced at ca. 1 wt. % solids and a pH of 10. An aliquot is injected into a capillary cell and a zetapotential measurement carried out on the instrument. The pH of the solution is titrated down 0.5 pH units at a time until a pH of 3 is reached. The isoelectric point is the pH at which the zetapotential crosses the X axis.

The dispersibility of an alumina dispersion is evaluated by producing a slurry at the indicated weight loading and pH (e.g. 5 wt. % at pH 10) and stirring for 30 minutes. The slurry is then centrifuged at 1600 rpm for 20 mins.

The viscosity of the dispersions is measured at the indicated concentrations, by transferring an aliquot of the dispersion into the concentric cylinder geometry of a TA instrument DHR 2 rheometer maintained at 25° C. A shear sweep is run from 0.1 to 3600 $s^{-1}$.

To more fully illustrate the present invention, the following non-limiting examples are presented.

EXAMPLES

Example 1

Boehmite alumina slurry was aged for 2.5 hours at 140° C. under autogenous pressure to achieve the desired crystallite size of 114 Å. The slurry was discharged from the reactor and portioned to provide identical batches.

A phosphono group containing modifier, trade name, Cublen P50 was diluted to 10% active using deionized water and added to the alumina slurry whilst stirring at 5 wt. % on an $Al_2O_3$ basis. The slurry was stirred for 30 minutes and then dried on a Buchi 290 spray dryer.

Example 2

The alumina slurry prepared as in Example 1 was modified using 7 wt. % Cublen P50 and dried using a Buchi B290 dryer.

Example 3

The alumina slurry prepared as in Example 1 was modified using 5 wt. % Cublen P50 and recharged into the reactor where it was aged for 1 hours at 105° C. and dried on a Buchi B290 drier.

Comparative Example 1

The alumina slurry prepared as in Example 1 was modified using 5 wt. % citric acid on an $Al_2O_3$ basis, aged at 105° C. for 1 hour and spray dried.

Comparative Example 2

The alumina slurry prepared as in Example 1 was modified using 5 wt. % citric acid on an $Al_2O_3$ basis, aged at 105° C. for 1 hour and spray dried. Malonic acid was then added as per the prior art.

Comparative Example 3

The alumina slurry as prepared as in Example 1 was doped with 1.5 wt. % nitric acid on and $Al_2O_3$ basis and spray dried.

Comparative Example 4

Unmodified alumina was used as a control.

The dispersibility of modified alumina of the present invention and the comparative examples are shown in Table 1, with the viscosities shown in FIGS. 1-3.

TABLE 1

Dispersibilities of modified materials:

| | Crystal Size Å | wt. % Modifier added | % dispersibility pH 10 | Viscosity of 10% sol at pH 10 (Pa · S) |
|---|---|---|---|---|
| Example 1 | 114 | 3 | 93 | 1.32 × 10e−3 |
| Example 2 | 114 | 7 | 90 | 1.36 × 10e−3 |
| Example 3 | 114 | 5 | 96 | 1.85 × 10e−3 |
| Comparative Example 1 | 114 | 5 | 96 | 0.027 |
| Comparative Example 2 | 114 | 5 | 95 | 0.010 |
| Comparative Example 3 | 114 | 1.5 | Gelled | 0.147 |
| Comparative Example 4* | 114 | 0 | 0 | 1.17 × 10e−3 |

*Sample did not disperse, and fell out of suspension once agitation was removed.

As can be seen, the modified alumina(s) of the present invention is highly dispersible at a pH of 10 with moderately low loadings of the phosphono group containing modifier. The dispersibility of the modified alumina of the present invention is similar to that of the Citric acid modified materials, however the viscosity of the materials when dispersed at 5, 10 and 20 wt. % is substantially different (FIGS. 1-3). The unmodified and acid modifier materials are not as dispersible under high pH conditions and would not be effective.

The invention claimed is:

1. A method for producing a modified alumina including the steps of:
   i) providing an alumina slurry, the alumina is an aluminum oxyhydroxide
   ii) aging the aluminium oxyhydroxide by hydrothermal treatment to form an alumina having a crystallite size of 35 to 350 Å as measured on the 120 plane; and
   iii) adding a phosphono group containing modifier which includes an organic phosphorous compound to the alumina to produce a surface modified alumina.

2. The method of claim 1 including a further step of aging the surface modified alumina to form an aged surface modified alumina.

3. The method of claim 2 including drying the surface modified alumina or the aged surface modified alumina.

4. The method of claim 1 wherein the phosphono moiety includes a primary phosphono-alkylcarboxylic acid, a secondary phosphono-alkylcarboxylic acids, a primary dicarboxylic acid, a secondary alkyl dicarboxylic acid, a primary phosphono-alkyl tricarboxylic acid, a phosphine alkane carboxylic acid or mixtures thereof.

5. The method of claim 1 wherein the phosphono group containing modifier is added in amounts of from less than 10 wt. % based on the alumina.

6. The method of claim 1 wherein the alumina is aged at a temperature of between 100° C. and 200° C. for a period of between 0.5 and 4 hours.

7. The method of claim 1 wherein the surface modified alumina is aged at a temperature of between 95° C. and 125° C. for a period of between 0.5 and 2 hours.

8. The method of claim 1 wherein drying takes place at a temperature of between 85° C. and 250° C.

9. The method of claim 1 including drying the surface modified alumina.

10. The method of claim 1, wherein the phosphono group containing modifier includes at least one carboxyl (COOH) group and bears at least one phosphono moiety.

11. A modified alumina:
said modified alumina having a phosphono group containing modifier which includes an organic phosphorous compound on the surface, and said modified alumina including a viscosity of less than 50 cP at 500 s-1 and at least one of the following characteristics after dispersion at a pH of 8 or above:
   i) an isoelectric point of at a pH of less than 4;
   ii) a dispersibility of greater than 90% when dispersed at a loading of 5, 10 or 20% into a basic solutions;
   iii) a particle size distribution having a D50 below 250 nm when dispersed at a loading of 5, 10 or 20% into a basic solutions.

12. The modified alumina of claim 11 including at least one of the following characteristics after dispersion at a pH of 8 or above:
   i) an isoelectric point of at a pH of less than 4;
   ii) a dispersibility of greater than 90% when dispersed at a loading of 5, 10 or 20% into a basic solutions;
   iii) a particle size distribution having a D50 below 250 nm when dispersed at a loading of 5, 10 or 20% into a basic solutions; or and/or,
   iv) a viscosity of less than 50 cP at 500 s-1.

* * * * *